(12) United States Patent
Zhao

(10) Patent No.: US 8,181,167 B2
(45) Date of Patent: May 15, 2012

(54) METHOD AND SYSTEM FOR PRESENTING AND ANALYZING SOFTWARE SOURCE CODE THROUGH INTERMEDIATE REPRESENTATION

(75) Inventor: Kan Zhao, Dublin, OH (US)

(73) Assignee: Kan Zhao, Dublin, OH (US)

( * ) Notice: Subject to any disclaimer, the term of this patent is extended or adjusted under 35 U.S.C. 154(b) by 1124 days.

(21) Appl. No.: 11/971,904

(22) Filed: Jan. 9, 2008

(65) Prior Publication Data

US 2009/0178031 A1   Jul. 9, 2009

(51) Int. Cl.
*G06F 9/45* (2006.01)
*G06F 9/445* (2006.01)

(52) U.S. Cl. .......................... 717/143; 717/144; 717/146
(58) Field of Classification Search ........... 717/140–148
See application file for complete search history.

(56) References Cited

U.S. PATENT DOCUMENTS

| | | | |
|---|---|---|---|
| 4,931,928 A | 6/1990 | Greenfeld | |
| 5,161,216 A | 11/1992 | Reps et al. | |
| 5,287,490 A * | 2/1994 | Sites | 717/142 |
| 5,339,433 A | 8/1994 | Frid-Nielsen | |
| 5,347,654 A * | 9/1994 | Sabot et al. | 717/151 |
| 5,491,821 A * | 2/1996 | Kilis | 717/146 |
| 5,557,730 A | 9/1996 | Frid-Nielsen | |
| 5,561,803 A * | 10/1996 | Kilis | 717/159 |
| 5,586,328 A | 12/1996 | Caron et al. | |
| 5,671,416 A | 9/1997 | Elson | |
| 5,740,444 A | 4/1998 | Frid-Nielsen | |
| 5,920,716 A * | 7/1999 | Johnson et al. | 717/141 |
| 5,940,615 A | 8/1999 | Novick et al. | |
| 6,031,993 A * | 2/2000 | Andrews et al. | 717/143 |
| 6,327,608 B1 | 12/2001 | Dillingham | |
| 6,339,776 B2 | 1/2002 | Dayani-Fard et al. | |
| 6,516,461 B1 * | 2/2003 | Ichisugi | 717/144 |
| 6,637,020 B1 * | 10/2003 | Hammond | 717/107 |
| 6,643,630 B1 | 11/2003 | Pegatoquet et al. | |
| 6,658,651 B2 | 12/2003 | O'Brien et al. | |
| 6,708,169 B1 | 3/2004 | Berry et al. | |
| 6,748,588 B1 * | 6/2004 | Fraser et al. | 717/146 |
| 6,799,718 B2 | 10/2004 | Chan et al. | |
| 6,820,256 B2 | 11/2004 | Fleehart | |
| 6,966,054 B2 * | 11/2005 | Simonyi | 717/144 |
| 7,110,936 B2 | 9/2006 | Hiew et al. | |
| 7,240,340 B2 | 7/2007 | Vaidyanathan et al. | |

(Continued)

OTHER PUBLICATIONS

Hashimoto et al, "A set and mapping based detection and solution method for structure clash between program input and output data" IEEE, pp. 629-638, 1990.*

(Continued)

*Primary Examiner* — Anil Khatri

(57) ABSTRACT

The present invention provides a method and system for producing intermediate representation of source code listings with possibly mixed syntaxes to assist software development applications in presenting and analyzing the source code listings through reading the intermediate representation. A source code processor calls Application Programming Interfaces (APIs) to preserve source code information, which includes intermediate representation data sets and is preferably stored in a file-based repository. The source code processor is of a compiler, a preprocessor, a parser, or a comment document processor. The data sets capture lexical, syntax and semantic information of source code construct elements, and comprise of location, processor identification, construct category, and attribute data. A software development environment through a source code search engine is able to present source code construct elements, outlines, and symbol references from software packages over a plurality of distributed servers in a network such as the Internet.

22 Claims, 15 Drawing Sheets

U.S. PATENT DOCUMENTS

| | | | | |
|---|---|---|---|---|
| 7,257,806 | B1* | 8/2007 | Chen et al. | 717/141 |
| 7,308,680 | B2* | 12/2007 | Grover et al. | 717/114 |
| 7,434,209 | B2* | 10/2008 | Brown et al. | 717/136 |
| 7,475,394 | B2* | 1/2009 | Calder et al. | 717/158 |
| 7,685,581 | B2* | 3/2010 | Plesko et al. | 717/146 |
| 7,747,989 | B1* | 6/2010 | Kissell | 717/148 |
| 7,788,652 | B2* | 8/2010 | Plesko et al. | 717/146 |
| 7,810,080 | B2* | 10/2010 | Plum et al. | 717/140 |
| 7,856,624 | B2* | 12/2010 | Plum | 717/140 |
| 7,934,207 | B2* | 4/2011 | Gustafsson et al. | 717/143 |
| 7,954,093 | B2* | 5/2011 | Fulton | 717/136 |
| 2003/0056192 | A1 | 3/2003 | Burgess | |

OTHER PUBLICATIONS

Sinha et al, "Abstract state machines as an intermediate representation for high level synthesis", IEEE, pp. 1-6, 2011.*

Ziavras, "Efficient mapping algorithms for a class of hierarchical systems", IEEE Trans. on Parallel & Dist. Sys. vol. 4, No. 11, pp. 1230-1245, 1993.*

Chong et al, "A mapping mechanism to support bitmap index and other auxiliary structures on tables stored as primary B+ trees", ACM SIGMOD, vol. 32, No. 2, pp. 78-88, 2003.*

Furr et al, "The ruby intermediate language", ACM DLS, pp. 89-97, 2009.*

Bengtsson et al, "A domain specific approach for software development on manycore platforms", ACM SIGARCH, vol. 36, No. 5, pp. 2-10, 2008.*

Dimitri van Heesch, Doxygen Manual, release v1.5.4, 1997-2007, http://doxygen.org.

Wei Li, Another metric suite for object-oriented programming, the Journal of Systems and Software, 44 (1998) 155-162.

Jean Mayrand, et al., Software assessment using metrics: A comparison across large C++ and Java systems, Annals of Software Engineering, 9 (2000), 117-141.

P. Tonella, et al., Reverse engineering 4.7 million lines of code, Software—Practice and Experience, 2000, 30, 129-150.

Kang Zhang and N. Gorla, Locality metrics and program physical structures, The Journal of Systems and Software, 54 (2000), 159-166.

S. Lapierre, et al., DATRIX (TM) Source Code Model and its Interchange Format: Lessons Learned and Considerations for Future Work, Soft. Eng. Notes, vol. 26, No. 1, Jan. 2001.

Bell Canada, DATRIX (TM) Abstract Semantic Graph Reference Manual, Version 1.4, May 1, 2000.

Tim Littlefair, An Investigation into the use of soft. code metrics in the industrial soft. dev. env., Ph. D. Diss., Jun. 2001, Health & Sci., Edith Cowan U., Australia.

Jonathan Bachrach and Keith Playford, The Java Syntactic Extender, OOPSLA 2001 (October) Conference Proceedings. http://people.csail.mit.edu/jrb/jse/jse.pdf.

A. Loconsole, et al., Report on Metrics 2001: the Science & Practice of Software Metrics Conference, Software Engineering Notes, vol. 26, No. 6, Nov. 2001.

G. Lommerse, F. Nossin, L. Voinea, A. Telea, The Visual Code Navigator: An Interactive Toolset for Source Code Investigation, Proc. IEEE InfoVis'05, IEEE Press.

Stauart I. Feldman, Make—a program for maintaining computer programs, Software—Practice and Experience, 9:255-265, 1979.

Everald E. Mills, Software Metrics, SEI Curriculum Module SEI-CM-12-1.1, Dec. 1988, ftp://ftp.sei.cmu.edu/pub/education/cm12.pdf.

Yih-Farn Chen, Michael Y. Nishimoto, and C. V. Ramamoorthy, The C Information Abstraction System, IEEE Software Engineering, vol. 16, No. 3, Mar. 1990.

A. Cimitile and U. E. Carlini, Reverse Engineering: Algorithms for Program Graph Production, Software—Practice and Experience, vol. 21(5), 519-537, May 1991.

Jong-Deok Choi, et al., On the Efficient Engineering Ambitious Program Analysis, IEEE Software Engineering, vol. 20, No. 2, Feb. 1994.

R. Banker, et al., Automating Output Size and Reuse Metrics in a Repository-Based Computer-Aided Software Engineering (CASE) Env., IEEE Soft.Eng, vol. 20, No. 3, Mar. 1994.

Norman Fenton, Software Measurement: A Necessary Scientific Basis, IEEE Software Engineering, vol. 20, No. 3, Mar. 1994.

Santanu Paul and Atul Prakash, A Framework for Source Code Search Using Program Patterns, IEEE Software Engineering, vol. 20, No. 6, Jun. 1994.

Shyam R. Chidamber and Chris F. Kemerer, A Metrics Suite for Object Oriented Design, IEEE Software Engineering, vol. 20, No. 6, Jun. 1994.

Santanu Paul and Atul Prakash, A query Algebra for Program Databases, IEEE Software Engineering, vol. 22, No. 3, Mar. 1996.

* cited by examiner

FILE: add.h

```
1  #define N1 1
2  #define N2 2
3  int add(int, int);
```

FILE: main.c

```
1  #include "add.h"
2
3  int main(int argc, char *argv[])
4  {
5     int sum;
6     sum = add(N1, N2);
7  }
```

FILE: add.c

```
1  #include "add.h"
2
3  int add(int x, int y)
4  {
5     return x + y;
6  }
```

FIG. 6

METHOD AND SYSTEM FOR PRESENTING AND ANALYZING SOFTWARE SOURCE CODE THROUGH INTERMEDIATE REPRESENTATION

FIELD OF THE INVENTION

This invention relates to software development tools and in particular to a method for presenting source code to software developers and analyzing software source code.

BACKGROUND OF THE INVENTION

A conventional compiler may save limited source code information in a symbol table for a debugging tool after compilation of a source code listing. The ctags and/or etags programs, often found in "UNIX®-like" operating systems, generate an index (or "tag") file for a variety of language objects found in source code file(s). The tag index files assist editors such as Vi and Emacs to locate the construct associated with a name/symbol appearing in a source code file and jump to the file and line which defines the name. However, a tag index file preserves only symbol definitions/references, and may generate inaccurate tags occasionally. A source code presentation tool such as an IDE (Integrated Development Environment) presents source code with typical features such as easy access of referenced symbol, syntax highlighting, outline of symbol definitions, and collapsing/expanding of source code constructs. Symbol tables and/or tag index files are not enough to supply information to support all those features. U.S. Pat. No. 4,931,928 provides a method for analyzing source code with a dedicated parser to extract source code information to be inserted into a database. In general, source code presentation, source code metrics collection, software reverse engineering, and other analysis tools require a parser to process the source code listings in order to obtain source code information of interest. Thus, there is a need to preserve lexical, syntax and semantic information of source code listings for source code presentation as well as analysis, especially after compilation.

Source code listings of computer software are likely a mixture of syntaxes of one or more programming languages, preprocessing, and documentation, and thus will be supplied to those language or syntax processors respectively. For example, a source code listing in JavaServer Pages™ (JSP) is a mixture of HTML and Java™. AST (Abstract Syntax Trees) of source code is typically used to represent the source code during compilation or source code analysis. DATRIXTM™ ASG (Abstract Semantic Graph) is an extension of AST, and offers a method to save source code syntax as well as semantics in flat files using data records. However, both AST and ASG are not a choice for representation of multiple syntaxes. Extending a programming language by means of a preprocessor has both merits and drawbacks. A preprocessor allows certain language extensions such as macro substitution, file inclusion, and conditional compilation. However, source code in a computer language with preprocessing syntax causes a syntax dependent on another syntax (preprocessing syntax), and is often context sensitive. As a result, a source code analyzer or a software reverse engineering tool based on AST for C or C++ often has to impose restrictions on the use of preprocessing. Preprocessing is an important feature of C and C++, however, there is no standard way of recording macro definition and expansion in a datastore. For programming languages such as Java™ and C# that do not use or use limited preprocessing, a source code file in those languages is often a mixture of syntaxes of a programming language and structured documentation in comments. For example, Javadoc is a document standard for generating Java™ API documents from Java™ source code, and Doxygen is a documentation system for C, C++, Java ™ and many other languages.

Browsing source code through a web browser often takes two approaches: static HTML pages and dynamically generated pages. An approach of the former is described in U.S. Pat. No. 5,940,615 that provides a method to generate static HTML pages from source code listings. A method using static HTML pages does not support user preferences and selections. In a latter approach, upon a request of a web browser, an HTML page is dynamically generated from a datastore maintaining source code information. Dynamically generating web pages allows the control of the page content on demand and the display of source code listings with preferred user settings, and drawings of dynamically generated graphs from the source code information datastore. Examples of graphs for source code listings are class relationship, method/function call graph, and reverse engineered design graph.

Open source web sites (such as SourceForge.net, Tigris.org and GNU.org) manage software release packages for download and version control. Some of the sites provide links to view individual source files. However, it is not possible to browse symbol definitions and references among large number of files, nor is it possible to show program structure or design through various graphs. In addition, a user cannot conveniently search a symbol usage across many packages.

At present, there are web sites, such as Google's source code engine and Koders.com, for searching open source software. In Google's source code engine, source code browsing page does not provide syntax and semantic information such as symbol reference. Koders.com is a site with all packages installed or copied, to a local system, then source code files are processed locally to extract source code information with a parser, and it is not implemented for distributed servers hosting source code packages. For a distributed source code search engine, the search engine and hosting servers are not integrated, and the search engine does not have to perform syntax and semantic analysis of source code packages on distributed hosting servers.

Integrated development environments (IDEs) such as Eclipse, Redhat Source Navigator™, Microsoft® Visual Studio®, and JetBrains IntelliJ® IDEA, are used to manage projects for software development. Browsing and presenting source code are often limited to source files of managed projects. They are stand-alone tools and are not designed to search and browse software over Internet. In addition, they are not targeted to manage thousands of software packages. There is a need to provide a method to search and present source code packages through an IDE from a network of distributed servers as if those packages are managed projects.

BRIEF SUMMARY OF THE INVENTION

The current invention provides a method for source code processors, including compiler, preprocessor, parser and comment document processor, to parse source code listings with possibly mixed syntaxes to generate Source code Intermediate Representation (SIR) data capturing source code syntax as well as semantic information. The method merges source code information generated from the source code processors and different rounds of compilation of a header source code file due to multiple inclusions.

The current invention eliminates source code parsing from a conventional source code presentation and analysis tools by making SIR data repository as a common ground for the needs of source code analysis as well as dynamic source code presentation through editor, integrated development environment, and web browser. A source code presentation tool, which may access source code listings hosted at a remote server through a network, presents source code construct elements, outlines, and symbol references without parsing the source code listings.

The current invention provides a method for constructing a site server hosting a plurality of source code packages for the purpose of source code presentation and maintenance, and facilitating a source code search engine to collect source code information from a plurality of distributes servers in a network. The current invention fulfills the demand to build a distributed client-server system for searching, maintaining and browsing source code among a multitude of software packages particularly open source software.

Features and advantages of the invention will become apparent upon review of the following description in association with the accompanying drawings.

BRIEF DESCRIPTION OF THE DRAWINGS

FIG. 6 shows contents of three source code listings in the C programming language as an example source code package for description of the current invention.

DETAILED DESCRIPTION OF THE INVENTION

For clarity and simplicity, the present invention will be described in reference to embodiments that process source code in C, provide services through web servers, and present source code through a web browser and an IDE (Integrated Development Environment). However, the current invention is not limited to any particular language, presentation environment, application, or specific implementation. In one of the embodiments below, although the current invention is illustrated through a C compiler, any source code analyzer or language parser that is capable of processing syntax and semantics of source code may also incorporate methods of the current invention. The order of algorithms and steps within them described in exemplary embodiments may be altered without affecting data results. In addition, for those skilled in the art, it is readily available to provide authentication process for restricting client access to a server through a network. Source code intermediate representation information in the following description is preferably stored in a file system, and can also be stored in a database.

It is understood by those skilled in the art, that as used herein, "source code" refers to the text that describes a computer software program and encompasses the concepts of "source", "code", "comment", "file", "header" and the like. Similarly, for those skilled in the art, it is understood the word "source code package" or "package", that used herein to encompass the concepts of "source code listing", "source code file", "makefile", "build script", "executable", "data file", "object file", "document", "directory", "archived file" and the like. In addition, source code "construct element" or "construct" refers to a segment of source code and encompasses token, expression, declaration, statement, function, method, class, type, and the like.

General Architecture

Figure 1:
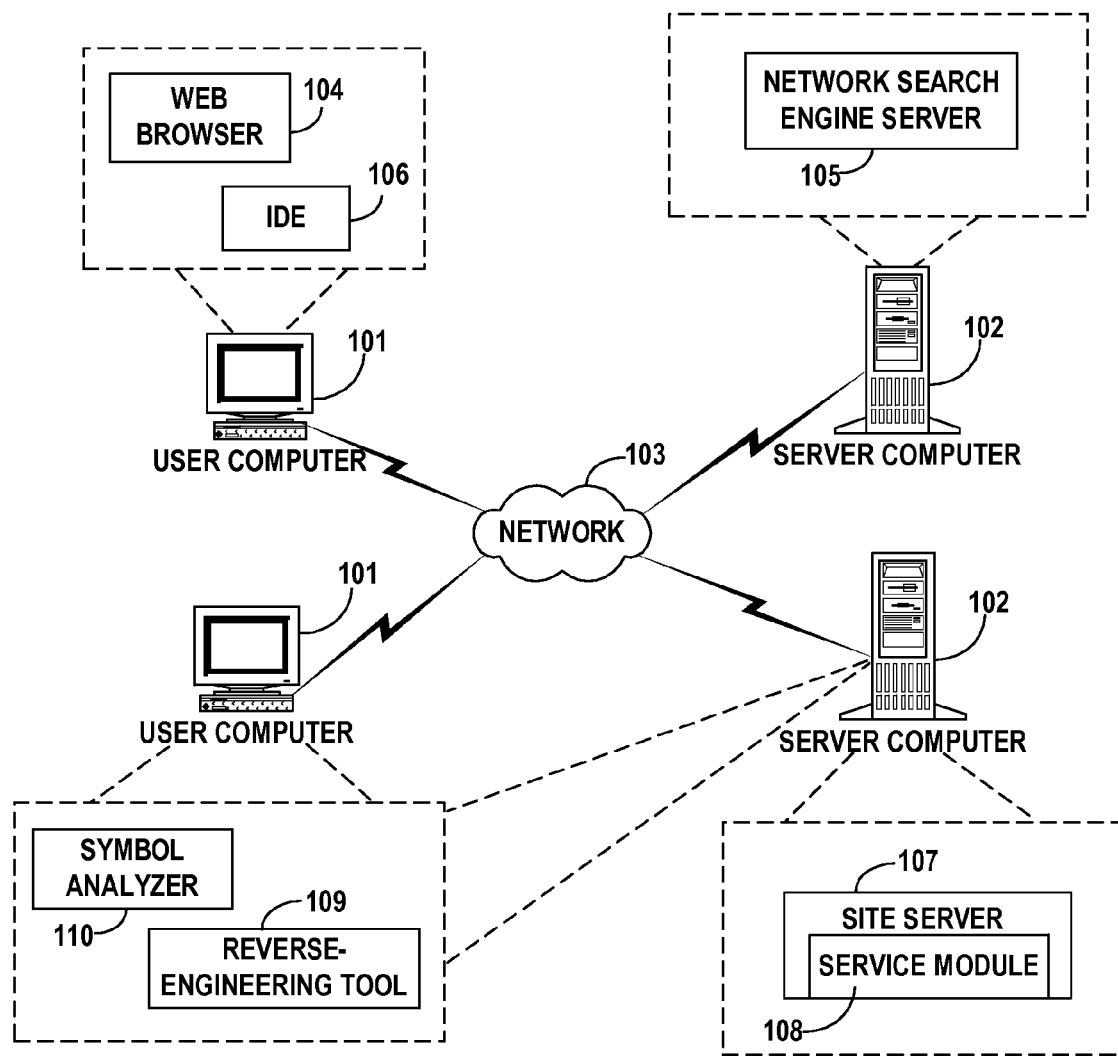
FIG. 1 is a network diagram of distributed computers in which the present invention may be embodied.

The present invention may be implemented in full or partial environment of a distributed computing system such as system 100 described in FIG. 1 or modifications thereof as will be readily apparent to those of skilled in the art. Distributed computing system 100 is a network of computers such as user computer 101 and server computer 102 connected through network 103. Network 103 is a medium used to provide communication between computers within distributed computing system 100. Network 103 may be a local area network (LAN), a wide area network (WAN), or a local area network connected to a wide area network through a combination of hardware devices such as firewalls and routers. An example of distributed system 100 is the Internet. Due to varieties of network usages, distributed computing system 100 may involve additional servers, clients, and other devices not shown.

A computer such as client computer 101 or server computer 102 is a computing system comprising of, coupled through a system bus, one or more Central Processing Units (CPUs), a system memory, and one or more of devices such as keyboard, display, sound, storage, printing, modem, and network interface (computing system components are not shown in the drawing). The system bus may include a memory controller, an I/O controller, and may use any of various bus architectures. The system memory may include read-only memory (ROM) and random-access memory (RAM). A computing system is also provided with a firmware program, for example a basic input/output system (BIOS), an operating system, Windows® XP or Linux for example, and one or more application programs such as web browser 104, IDE (Integrated Development Environment) 106, software reverse-engineering tool 109, source code symbol analyzer 110, web site server 107, search engine server 105, and other applications not shown. An application consists of one or more executable files and possibly other shared or archived libraries that are loaded to memory during execution. A shared or archived library may be a Java™ archive file, or dynamically linked library (for example, .dll library file for Windows® or .so library file for Linux). In FIG. 1, web site server 107 includes service module 108, which provides services for accessing source code packages hosted (not shown in FIG. 1) on the server, and may be of shared or archived library.

User computer 101, for example, a personal computer, a workstation computer, or a laptop computer, is connected to a network as needed. User computer 101 when connected to a network can make requests to server computer 102, for example obtaining source code listings and information for syntax and semantics of the listings, through network 103. Server computer 102, for example, a computer hosting site server 107 for source code packages, is constantly connected to a network through one or more devices such as router, proxy, and/or firewall (not shown in FIG. 1), and ready to service requests from client computers at any moment. A server computer may also make requests to another server computer through a network. For example, network search engine 105 may collect information from site server 107. In addition, software applications such as source code analyzers (109 and 110) may also run on server computer 102. Those skilled in the art may implement the invention with other computer system configurations such clustered computers and mainframe computers.

Figure 2:
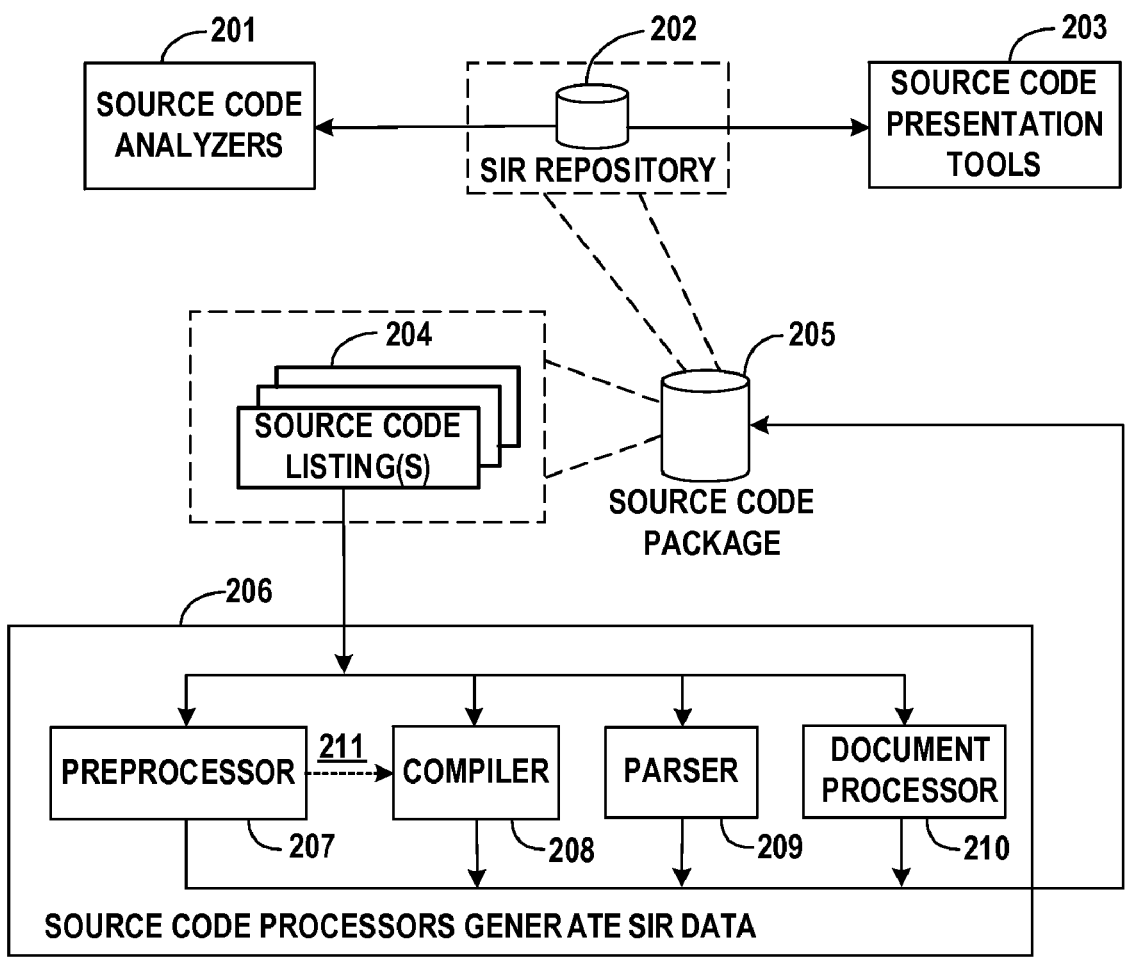
FIG. 2 is a block diagram showing the components for generating Source code Intermediate Representation (SIR) data and making use of the SIR data.

Diagram 200 in FIG. 2 is a block diagram showing data flow among data source/destination (205), source code processors (206), and software development application collections (201 and 203). Source code processors (206) generate Source code Intermediate Representation (SIR) data stored in repository 202 for source code package 205. SIR repository 202 becomes part of package 205. Software development application collections (201 and 203) make use of the SIR data (Repository 202). Source code listings 204 as well as generated SIR data in repository 202 belong to package 205. Applications in collection 201 are source code analyzers, for example, reverse-engineering tool 109 and symbol analyzer 110 in FIG. 1. Applications in collection 203 are source code presentation tools, for example, IDE 106 and source code site server 107 for web browser 104. Applications in both collections for the current invention make use of SIR data for source code analysis or presentation. Source code processors listed in block 206 are modified from conventional source code processors to call APIs (Application Programming Interfaces) to produce SIR data. "Source code processor" as used herein refers to a software application that comprises operations performing lexical, syntax and/or semantics analysis of a source code listing.

A source code listing goes through one or more source code processors. If the source code listing is of C, it is preprocessed by preprocessor 207, and then compiled by compiler 208. The control flow between preprocessor 207 and compiler 208 is depicted using a dashed line with an arrow end (211). If a source code listing is of Java™, besides compilation, it may be processed by document processor 210 to obtain documentation information. If a source code listing is of a scripting language or an interpreted language that does not require a compilation, parser 209 may be used to extract SIR data. Source code in a compilation language may also be fed to parser 209 to generate SIR data.

Generation of Source Code Intermediate Representation (SIR) Data

Figure 3:
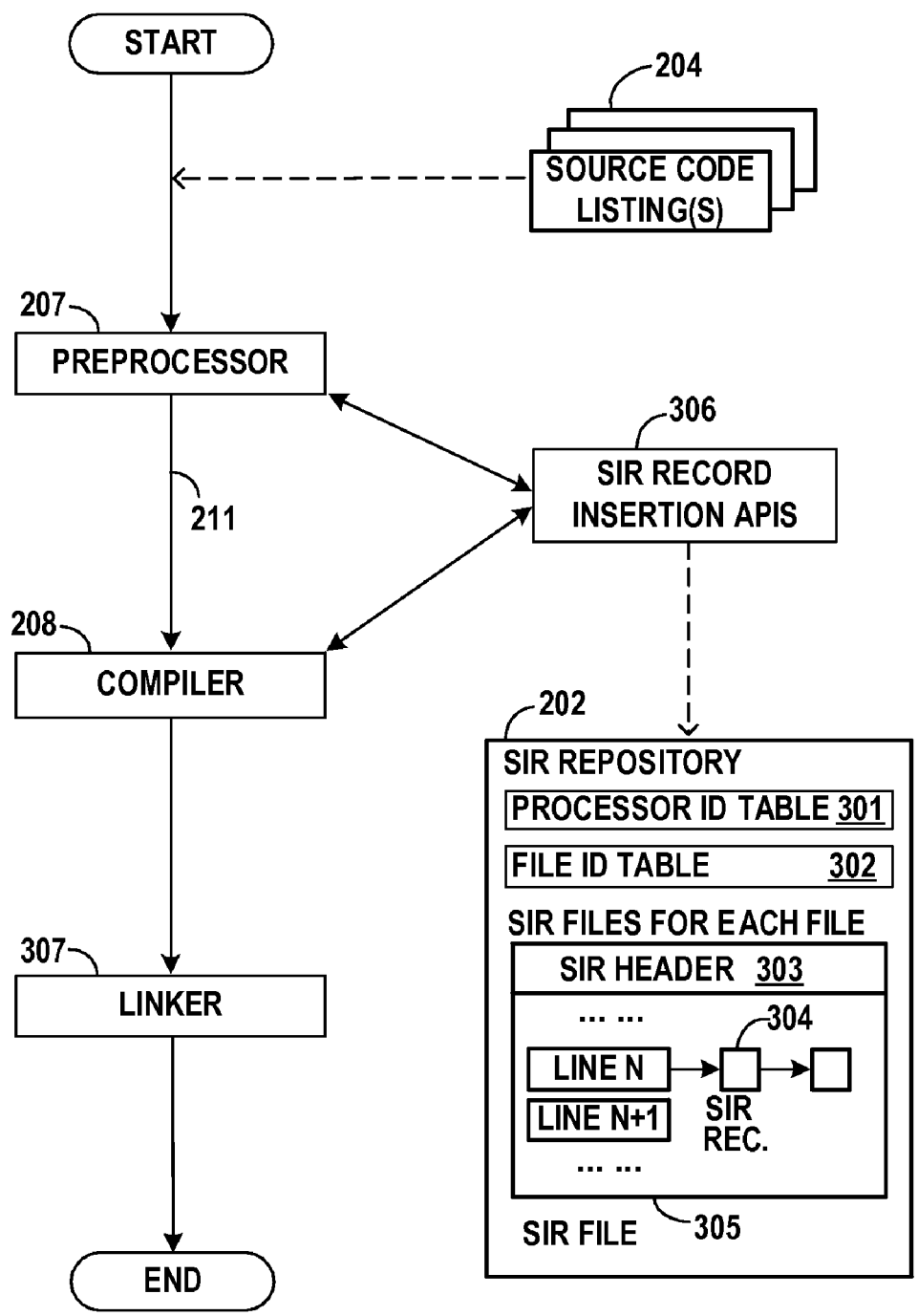
FIG. 3 is a block diagram illustrating typical C compilation phases compiling source code files into executables and calling APIs in an embodiment of the present invention to generate SIR data.

An exemplary embodiment of the current invention uses a C compiler to generate SIR data. FIG. 3 describes a high-level flowchart for C compilation process. For a C compiler, preprocessor 207 and compiler 208 are two phases that execute in sequence. Compiler 208 generates object files from preprocessed source files. Finally, linker 307 creates executable programs from object files. Repository 202 shows data components of a SIR repository. The current invention incorporates changes to both phases of the C compiler to generate SIR data stored in repository 202. Both preprocessor 207 and compiler 208 write to SIR repository 202 through APIs 306 (Application Programming Interfaces). Procedures for generating SIR data for a compilation phase are described in FIG. 4 and FIG. 5.

Figure 4:
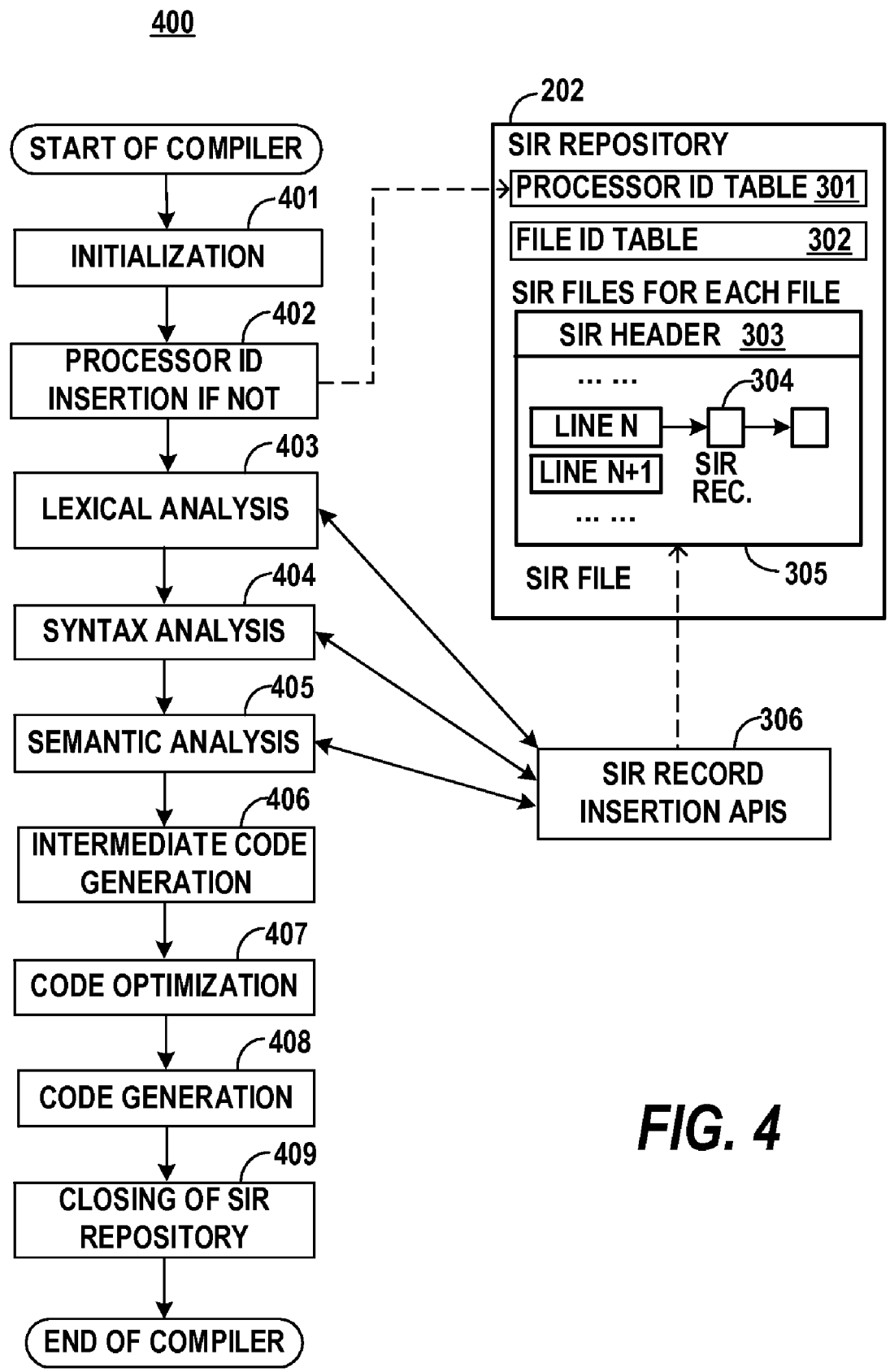
FIG. 4 is a flowchart illustrating detailed compilation steps in an embodiment of the present invention and invocations of SIR APIs.
Figure 5:
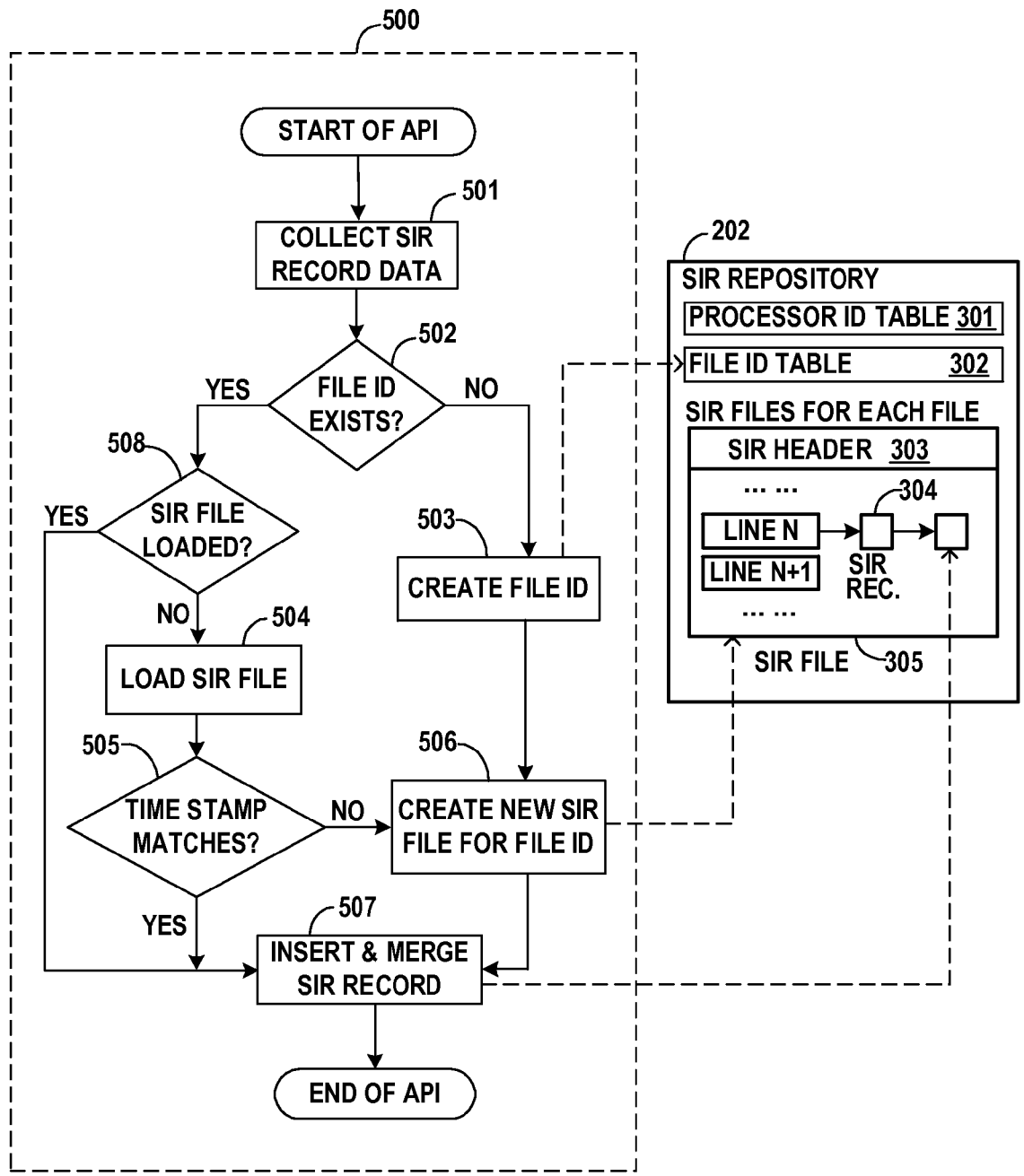
FIG. 5 is a flowchart illustrating a SIR insertion API.

SIR repository 202 in FIG. 3, FIG. 4 and FIG. 5 describes a composition of a SIR repository. The repository comprises multiple entities containing data records to store a processor identifier mapping table (301), a source code file identifier mapping table (302), and a SIR record file for each source code file, assuming that a source code listing is stored in a file. The purpose of creating an identifier for a processor is to let all SIR records in a repository hold a processor identifier to keep track of which source code processor has created the records using specific compilation options if any, and language specification version if any. A unique integer may be assigned to each processor and saved in a processor identifier mapping table as part of composition in SIR repository 202. For example, a macro symbol definition record holds the identifier of a preprocessor. In addition, processor name and options passed to the processor may be saved in processor identifier mapping table. Processor and file identifier tables may be stored together in a file. Identifiers for processors and files are keys with fewer bytes for uniquely identifying processors and files respectively. However, SIR records for each source code file is preferably stored in a separate file so that a compiler may load and save an individually changed file on demand. The file name of SIR record file may be named using file identifier with an extension, for example, "2.sir" for a source code file having 2 as the identifier. A compiler through APIs creates and maintains a SIR repository, which may be maintained in a subdirectory of a source code package.

In a different embodiment, SIR records of a source code file by different processors may be stored separately so that a record does not need to include processor information, in such a case, the processor information is implicitly embedded in the SIR record.

Block 305 in FIG. 3, FIG. 4 and FIG. 5 contains a data structure layout for a SIR record file, which consists of a header record 303, and a list of line records, each of which may contain pointers to a list of SIR records 304 for a line of source code. Header record 303 may comprise fields storing information about version information of a SIR repository, and properties such as time stamp, checksum, and total number of lines of the source code file.

Diagram 400 in FIG. 4 shows a flowchart for compiler 208 illustrating high-level stages for the current invention. After stage 401 for initialization including processing compilation options, a conventional compiler is wrapped inside stages 403, 404, 405, 406, 407 and 408. Stage 402 creates a processor identifier in a processor identifier mapping table if an identifier for compiler 208 does not exist. Stage 403 is to perform lexical analysis of a conventional compiler, and is modified for the current invention to call SIR insertion APIs 306 and insert records for source code tokens. Stage 404 is to perform syntax analysis to identify the syntactic structure of a source code and is modified to call SIR insertion APIs 306 and insert records for source code construct elements. Stage 405 is to perform semantic analysis, and is modified to call SIR insertion APIs 306 to add semantic information to syntactic construct elements. Stage 406 is an intermediate code generation stage of a conventional compiler. Stage 407 is for code optimization. Stage 408 is for code generation. Finally, if there are no errors, stage 409 for the current invention is to save and close SIR repository data files.

Chart 500 of FIG. 5 depicts a flowchart illustrating operations of a SIR insertion API. At step 501, content of a SIR record is collected from arguments and accessible variables/objects. Decision step 502 branches the control flow into two flows depending on the status of a source code file in the repository. If the file has not been processed before (a file identifier does "NOT" exist in table 302), step 503 will create a mapping entry for the file. If the file has been processed before, and the SIR file for the source code file is not loaded ("NO" at decision step 508), then the SIR file is loaded into memory in step 504, conditional step 505 makes use of time stamp saved in header record 301 to decide whether or not to create a new SIR file at step 506. Step 507 inserts a record to list 304 if the record is not already in the list. Checking presence of a record in list 304 is needed to ensure that no multiple copies of a record getting inserted due to multiple processing of the same file, for instance, file inclusion of a header file may be included multiple times, as a result, it gets compiled multiple times during compilation. In addition, different stages of compilation may call multiple APIs to create SIR records to be associated with the same construct element. The operation of checking and combining data attributes of SIR records for the same construct element to form a single record with multiple attributes is called record merging (merging SIR records).

In FIG. 5, SIR file 305 gets loaded into memory in step 504. Step 409 of FIG. 4 writes memory copies of modified SIR files into files on disk. It is necessary to load and save SIR files on demand in order to reduce compilation time and memory usage.

During preprocessing or compiling a source code file, a source code processor calls a SIR insertion API shown in the flowchart of FIG. 5, when it detects a symbol definition (a new type for example), a symbol reference (expanding a macro for example), or a boundary (start and/or end) of a source code construct (start of conditional compilation block #if for example or start of a function definition).

An insertion API for a construct boundary may carry the following arguments or may get the following data objects from its scope: (1) Location of the construct boundary; (2) Processor identification (for example, a processor identifier from a mapping table); (3) SIR Category of boundary indicating starting and/or ending of a source code construct; and (4) Construct type (such as class, function, statement, macro definition, or conditional compilation block).

A symbol definition insertion API for adding a SIR record of source code construct may carry the following arguments or may get the following data objects from its scope: (1) Location of the symbol; (2) Processor that recognizes the symbol; (3) Symbol definition category (such as macro, class, variable, or method); and (4) Symbol token string;

A symbol reference insertion API for a symbol binding may carry the following arguments: (1) Location of the symbol making a reference; (2) Processor that recognizes the symbol; (3) Symbol reference category (such as macro expansion or reference to a class); (4) Symbol token string; and (5) Location of the referenced symbol.

The above three insertion APIs are APIs used to provide fundamental source code information for a tool to present, navigate, and search program source files. Additional insertion APIs may be added to represent source code lexical, syntax, and semantic information, for example, APIs that add SIR records to store header file inclusion, to store macro expansion during preprocessing, and to store all tokens of a file so that a SIR file can recover the original source code content. Insertion API may be used to track document syntax in comments for a document processor. All SIR records are merged into groups for source code listings and lines.

A SIR record is created with respect to two construct elements: an enclosure construct and a role construct. The enclosure construct is a construct that the SIR record is created for and provides interpretation information for. The role construct is a construct that plays a role in contributing to the SIR record. A location in the SIR record is associated with the role construct. The role construct may be the same as the enclosure construct. In general, the role construct is a child construct for composing the enclosure construct. For example, for a SIR record created for a function definition, the function name/symbol is the role construct, and the function is the enclosure construct. The example illustrated in FIG. 6 and FIG. 7 uses terminal constructs (i.e. tokens) as role constructs for associating SIR records.

In comparison to conventional AST/ASG representation, the source code representation using SIR records preserves syntax and semantics information by associating the information with locations of role constructs. By inspecting localized SIR records associated with a role construct, a software development application is able to quickly find out the roles of the construct and provide accurate presentation and analytic data of source code listings. The representation does not require a complete recording of syntax and semantics, and SIR records are added accumulatively and as needed.

The information gathered for an API creating a SIR record is grouped into four segments: (1) Location of a role construct; (2) Information of processor invoking the API; (3) SIR record category information; (4) Data attributes describing the record. The location of the role construct may include starting and ending character locations of the construct. An implementation of the current invention may store only the column number, and other location information can be derived from the SIR file, arrangement of a SIR record, and token string length. In a different embodiment of the current invention, SIR records created by different processors may be separately stored in different files so that SIR records within a file are produced by the same processor, and may not need to carry processor information, since the file storing SIR records implicitly supplies the processor information. Source code intermediate representation data set is a term used to collectively describe all explicit fields of a record plus additional implicit fields implied by the context storing the record.

SIR records for lexical, syntax and semantics of source code in a programming language may have the high-level categories listed in Table 1.

TABLE 1

| Category | Description | Example |
| --- | --- | --- |
| Token | An atomic construct of a language source code or a delimiter sequence | "=", "+=", "+", a key word, a symbol, constant/literal, or a comment region indicator ("//", "/*" and "*/" in C++). |

TABLE 1-continued

| Category | Description | Example |
|---|---|---|
| Construct Boundary | A location or region range locations of a source code construct element. | The first character location of the first token of a function in C (start location), the location of function body closing character "}" of a function, or the start and end locations of a statement. |
| Construct Identity | A symbol that a source code construct element defines. A construct element may have more than one identity defined. | Class, type, struct, namespace, template, interface, delegate, enumeration, variable, function, method, parameter, and macro. |
| Relationship | A relationship from a construct element to another construct element, or to an external entity. | A symbol reference to its definition, external web reference of symbol "String" in Java ™ source to a URL of string class document. An edge from a node to another node in an abstract syntax tree (AST). |
| Interpretation | A property or data value attached to a source code construct element. | Macro expansion and value of a constant expression. |

A data attribute of a SIR record preserves lexical, syntax or semantics information of a role construct element for describing an explanation or a property of the role construct element in regard to an enclosure construct element. The data attribute may also be used to store a boundary or a description of the enclosure construct element. SIR records provide a way to represent source code listings with parsing information reserved. A SIR record may carry multiple data attributes.

Figure 7:
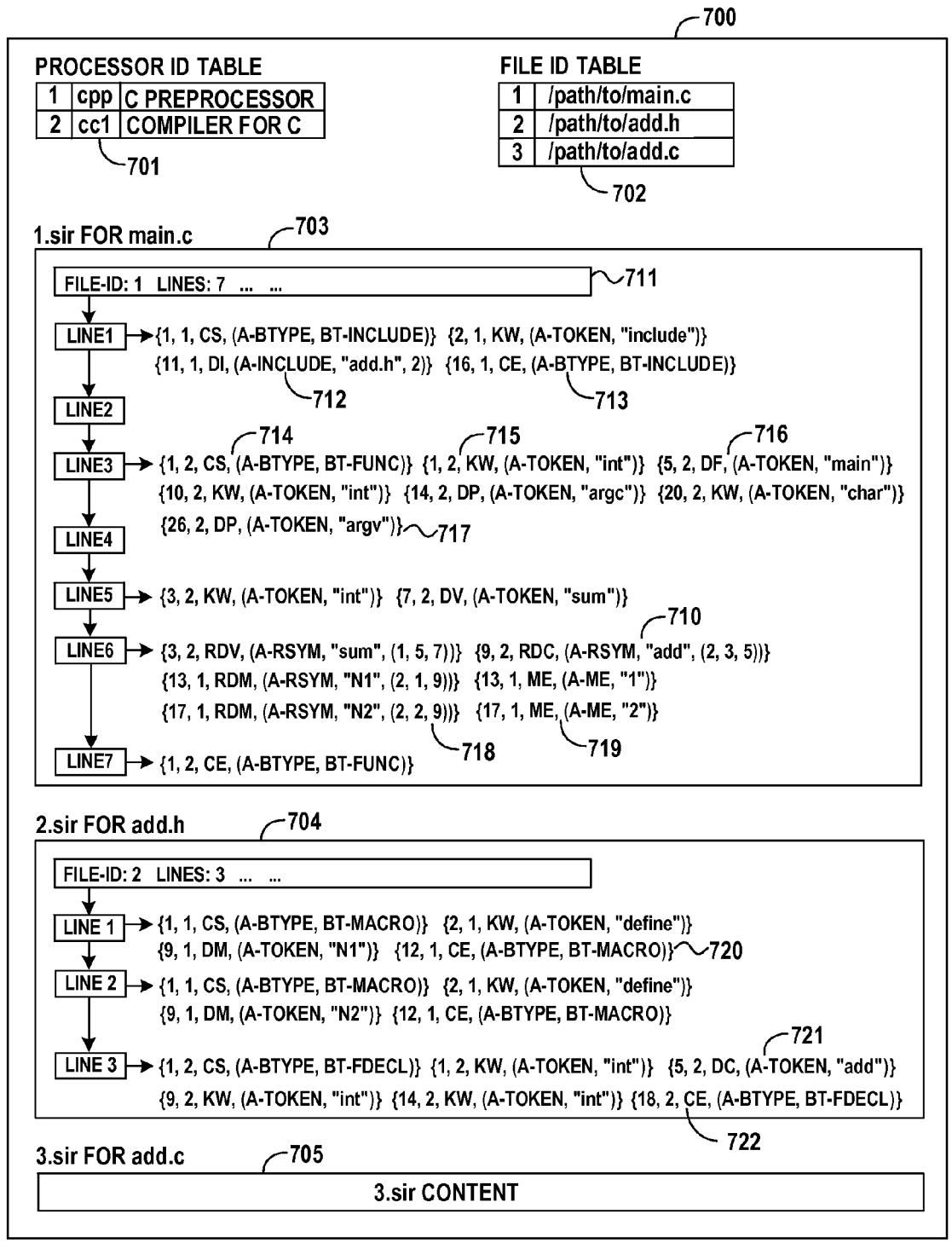
FIG. 7 shows SIR data for the three C source listings shown in FIG. 6.

FIG. 6 shows an example source code package for illustrating source code intermediate representation repository in FIG. 7. FIG. 6 shows three C files containing three source code listings that will be used by a compiler of the current invention to generate a SIR repository, which includes a processor identifier mapping table, a file identifier mapping table, and three SIR files shown in FIG. 7. Block 601 shows a header source code listing stored in a file called "add.h" that is included by the other two source code files: "main.c" shown in block 604, and "add.c" shown in block 605. Numbers to the right of each file, for example "1" indicated by label 602, are line numbers for a source code listing within a file; and numbers below each file directly under a vertical dashed line, for example "5" indicated by label 603, are column numbers of character location within a line.

In FIG. 7, block 700 shows a composite of a SIR repository after compilation of "main.c" and "add.c". Mapping table 701 is for processor identifiers. Mapping table 702 is for file identifiers. Block 703 shows a data structure for the SIR file of "main.c", block 704 for "add.h", and block 705 for "add.c" (content of 3.sir is not shown in block 705), respectively. Assume that a compilation process preprocesses "main.c" first, since "add.h" is included by "main.c" at line 1, thus "main.c" has a file identifier of 1, and then "add.h" has an identifier of 2. Those skilled in the art may alter SIR file data structure shown in FIG. 7 without departing from the scope and spirit of the current invention.

For the purpose of illustration, braces "{"and"}" surround the content of a SIR record. A data attribute in a SIR record is surrounded by parentheses "("and")". A triplet of referenced file identifier, line, and column surrounded by parentheses describes the location of a reference relation inside an attribute. Since SIR records are organized within a line, the location in a SIR record is described using the column number of the first character of a token. A listing of detailed categories for SIR records used herein is described in Table 2.

TABLE 2

| SIR Category | Description | High-Level Category |
|---|---|---|
| TK | Token (atomic construct) | Token |
| CS | Start of source code Construct | Boundary |
| CE | End of source code Construct | Boundary |
| DI | Declaration of file Inclusion | Relationship |
| DC | Declaration of Function | Identity |
| DF | Definition of Function | Identity |
| DP | Declaration of Parameter | Identity |
| DV | Declaration of Variable | Identity |
| DM | Definition of Macro | Identity |
| RDV | Reference of Variable | Relationship |
| RDC | Reference of Function Declaration | Relationship |
| RDM | Reference of Macro | Relationship |
| RDP | Reference of Parameter | Relationship |
| ME | Macro Expansion | Interpretation |
| KW | Key Word | Token |
| AST_ASSIGN | AST assignment node | Relationship |
| AST_ASSIGN_L | AST left operand node | Relationship |
| AST_ASSIGN_R | AST right operand node | Relationship |
| AST_SYM | AST symbol node (terminal) | Interpretation |
| AST_CALL | AST function/method call node | Relationship |
| AST_PARM | AST call parameter node | Relationship |
| AST_NUM | AST number constant node (terminal) | Interpretation |

Table 3 describes the data attributes used by the SIR records for the example source code listings.

TABLE 3

| SIR Attribute | Purpose of Attribute |
|---|---|
| A-BTYPE | Boundary type (BT_STMT, BT_MACRO, BT_FDECL, BT_FUNC and BT_INCLUDE) |
| A-INCLUDE | Header file inclusion |
| A-NUM | Integer number literal |
| A-RSYM | Reference of a symbol |
| A-TOKEN | Token string |
| A-ME | Macro expansion |
| A-SIR | Nested SIR record as an attribute |
| A-AST-CHILD | AST child node list |
| A-AST-TERM | AST terminal node |
| A-LEN | Number of characters of a construct |

For clarity of illustration, SIR records shown in FIG. 7 are associated with role constructs at atomic level, namely tokens. In a different embodiment, SIR records can be associated with higher level composite constructs such as expression, statement, and function. In addition, FIG. 7 shows limited categories of SIR records, and SIR records are attached to tokens with syntax and semantic information. However, pure tokens such as parentheses and operators are not recorded. Not all data fields of a SIR file are shown in FIG. 7. For example, block 711 is the header record for 1.SIR, and shows only two relevant fields of SIR file header record: file-id and number of lines. The number of attribute fields in a SIR record is not fixed, and each SIR record contains: column location, processor identifier, SIR category, and at least one data attribute. A SIR record may carry boundary attribute (such as SIR record 713, record 714, record 720, and record 722), token string attribute (such as record 715), header file inclusion attribute (such as record 712), function definition attribute (such as record 716), and function declaration (such record 721). SIR record 712 shows a string "add.h" with file identifier 2, for representing file inclusion at line 1 of main.c. SIR record 710 shows a function declaration reference with symbol "add", file identifier 2 (for "add.h"), line number 3, and column number 5. Record 717 declares a parameter ("argv") of function "main". SIR record 718 shows a macro reference with symbol N2, file identifier 2, line number 2, and column number 9. SIR record 721 shows a symbol "add" for declaration of a function. A token or character location may be associated with more than one SIR record, for example, SIR records 718 and 719. SIR records may be nested, and a SIR record may be an attribute of another SIR record. Nested SIR records are used to describe macro expansion in C pre-processing.

If all tokens and statement boundaries are included, the SIR record list for line 6 of 1.sir for main.c becomes the following: {3, 2, CS, (A-BTYPE, BT-STMT)}, {3, 2, RDV, (A-RSYM, "sum", (1, 5, 7))}, {7, 2, TK, (A-TOKEN, "=")}, {9, 2, RDC, (A-RSM, "add", (2, 3, 5))}, {12, 2, TK, (A-TOKEN, "(")}, {13, 1, RDM, (A-RSYM, "N1", (2, 1, 9))}, {13, 1, ME, (A-ME, "1", {1, 2, TK, (A-TOKEN, "1")})}, {15, 2, TK, (A-TOKEN, ",")}, {17, 1, RDM, (A-RSYM, "N2", (2, 2, 9))}, {17, 1, ME, (A-ME, "2", {1, 2, TK, (A-TOKEN, "2")})}, {19, 2, TK, (A-TOKEN, ")")}, {20, 2, TK, (A-TOKEN, ";")}, {20, 2, CE, (A-BTYPE, BT-STMT)}.

Figure 8:
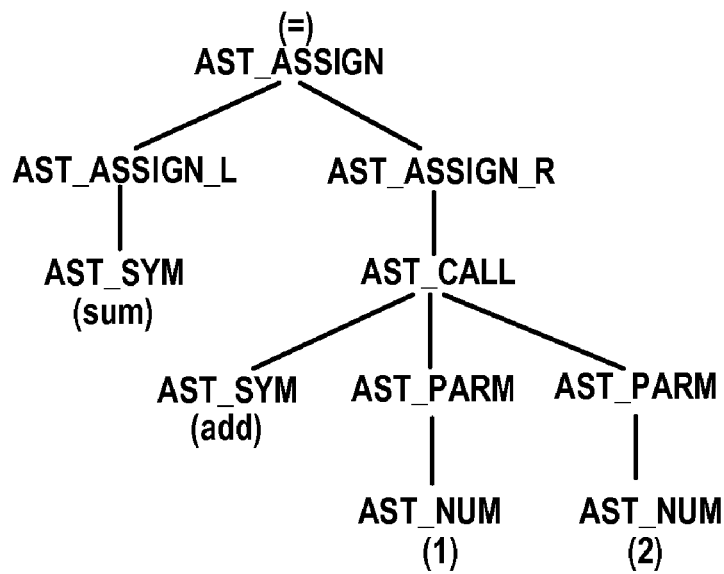
FIG. 8 shows an Abstract Syntax Tree (AST) that may be represented using SIR records.

SIR records may also be used to describe an abstract syntax tree (AST). For example, the AST shown in FIG. 8, for the assignment statement in line 6 of main.c, can be represented using the following SIR record list: {7, 2, AST-ASSIGN, (A-AST-CHILD, (AST_ASSIGN_L, 1, 6, 3), (AST_ASSIGN_R, 1, 6, 12))}, {3, 2, AST_ASSIGN_L, (A-AST-CHILD, (AST_SYM, 1, 6, 3))}, {3, 2, AST_SYM, (A-AST-TERM)}, {9, 2, AST_ASSIGN_R, (A-AST-CHILD, (AST_CALL, 1, 6, 12))}, {9, 2,AST_CALL, (A_LEN, 11), (A-AST-CHILD, (AST_SYM, 1, 6, 9), (AST_PARM, 1, 6, 13), (AST_PARM, 1, 6, 17))}, {9, 2, AST_SYM, (A-AST-TERM)}, {13, 1, ME, (A-ME, "1", {1, 2, TK, (A-TOKEN, "1")}, {1, 2, AST_PARM, (A-AST-CHILD, (AST_NUM, 1))}, {1, 2, AST_NUM, (A-AST-TERM)}}, {17, 1, ME, (A-ME, "2", {1, 2, TK, (A-TOKEN, "2")}, {1, 2, AST_PARM, (A-AST-CHILD, (AST_NUM, 1))}, {1, 2,AST_NUM, (A-AST-TERM)}}.

In a different embodiment of the current invention, each SIR file may contain a file identifier mapping table and a processor identifier mapping table instead of package shared mapping table, or completely eliminate mapping tables through replacing identifiers in SIR records with text of file path or processor description. Identifier mapping and SIR files may be stored in structured binary format or text format such as XML format. In addition, a symbol location mapping table for externally referenced symbols/constructs may be created for location independent relationship. A SIR record of relationship category may contain a location of another construct element. The location used in FIG. 7 are absolute line and column location with in a file, if the file is modified, the relationship location becomes invalid and needs to be updated. An entry in a symbol location mapping table of a SIR file assigns an identifier for a symbol defined in its source code file, and the entry stores the location of the symbol. The identifier may be an integer or a mangled symbol from symbol definition signature. With the mapping table, a relationship record may be established using the mapped identifier of a referenced symbol/construct. A change causing location shift for symbol definitions needs only to update locations in the mapping table.

Figure 9:
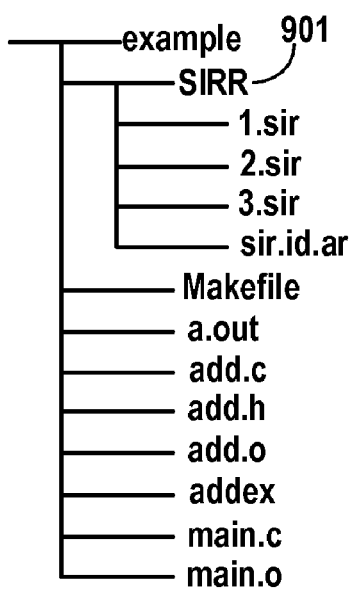
FIG. 9 shows a directory structure of the example source code package after compilation.

FIG. 9 shows a directory structure for the example source code package after compilation. Directory 901 (SIRR—Source code Intermediate Representation Repository) stores data files generated by SIR insertion APIs. SIR record data files have an extension of ".sir". Processor identifier and file identifier mapping tables are stored in "sir.id.ar".

Source Code Presentation Using SIR Data

A method is provided to consume the SIR file of a source code file to present source code with easy access of referenced symbols and syntax highlighting. The environment for an embodiment of the method is depicted in FIG. 1. Source code files with their SIR files are stored in a server computer such as server computer 102. Web Browser 104 makes an HTTP request to web site server 107 through network 103. Then, site server 106 deliver the request to server module 108 to be handled.

Figure 10:
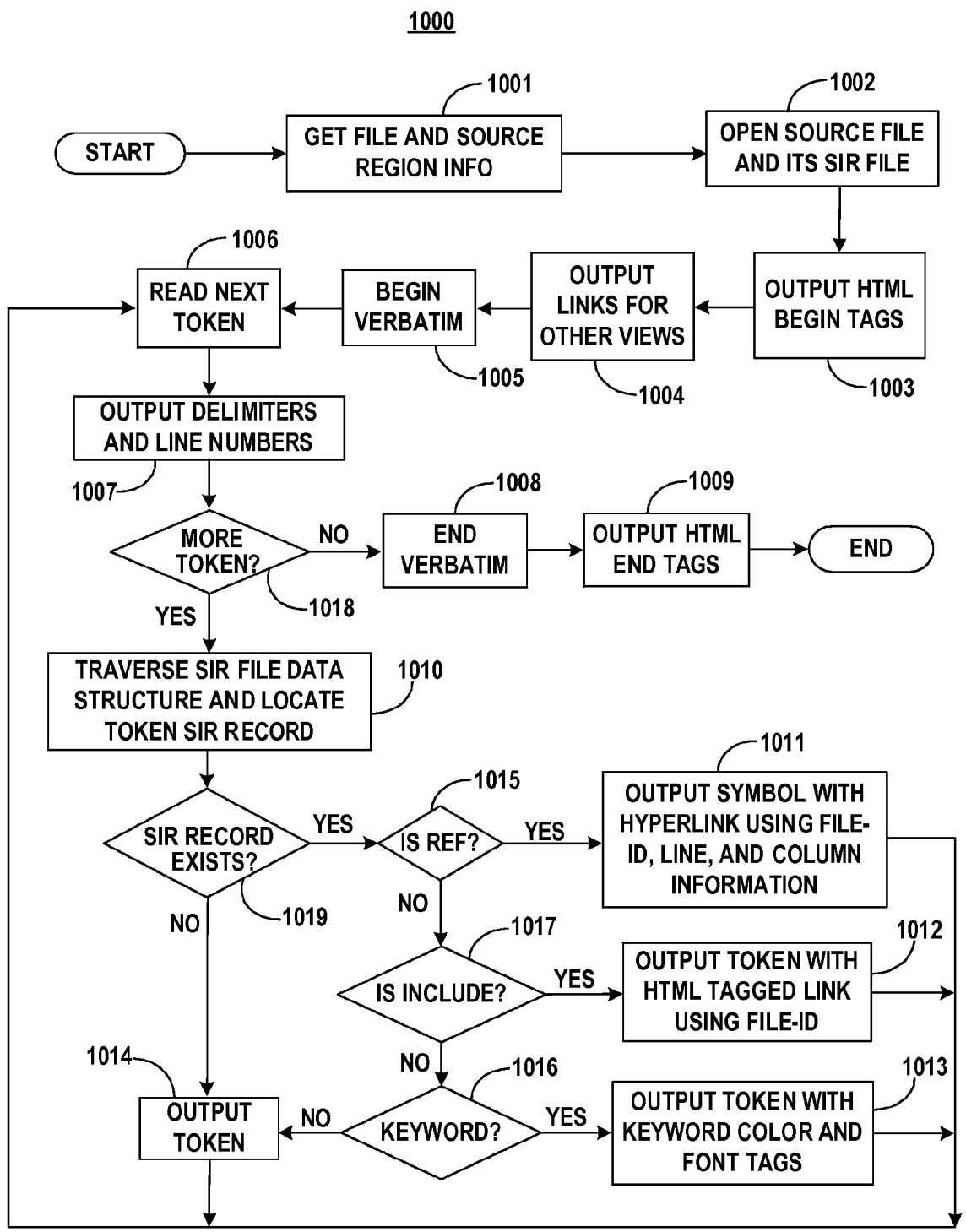
FIG. 10 is a flowchart illustrating a procedure to create HTML content with control tags using SIR data for source code browsing through a web browser.
Figure 11:
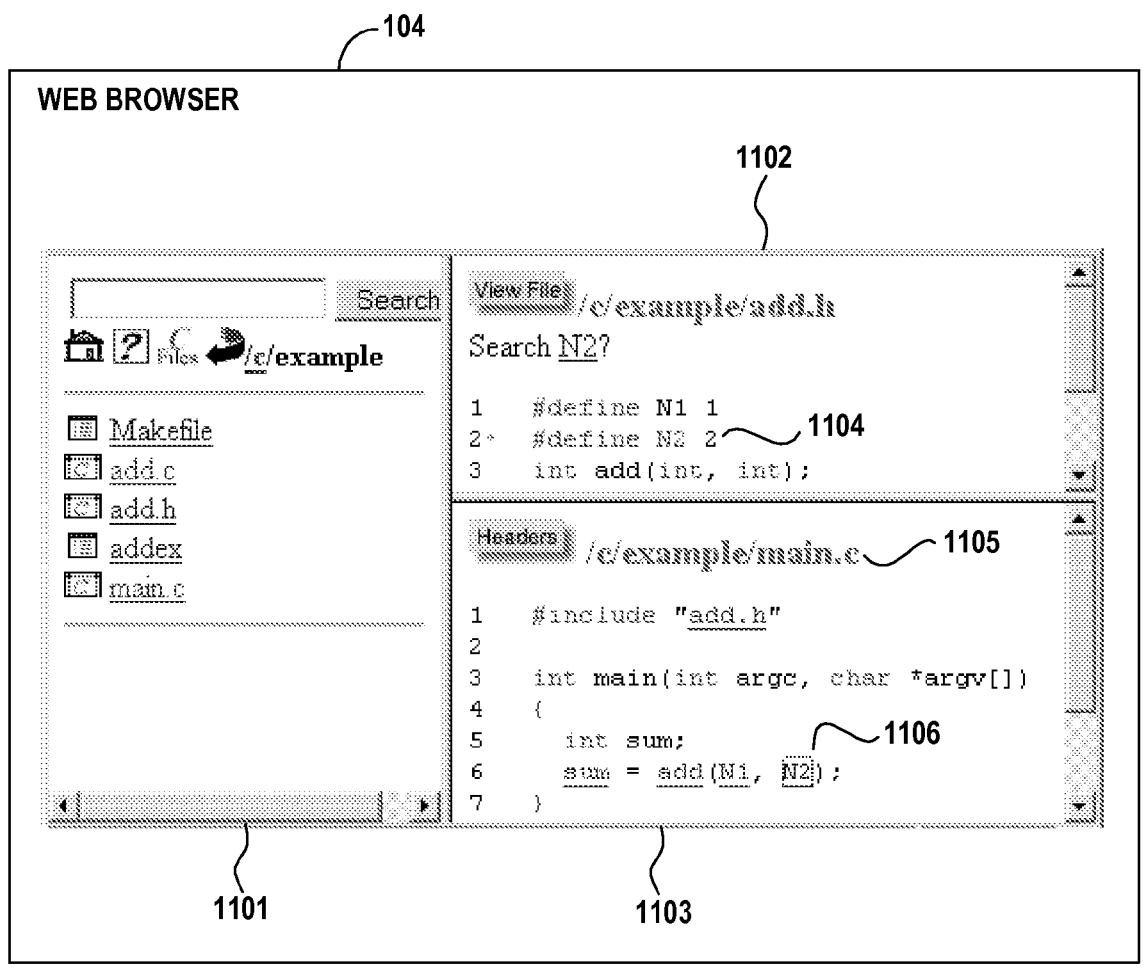
FIG. 11 shows a screen dump of three frames of a browser presenting the example source code package using the procedure in FIG. 10.

Flowchart 1000 in FIG. 10 shows a procedure implemented for server module 108 to create an HTML page for a requested source code file or a segment of a file. FIG. 11 shows a screen dump of three window frames of a web browser (such as browser 104 in FIG. 1) for browsing source code. For the purpose of clarity, each frame is given a name: "control" frame 1101, "main" frame 1103, and "overview" frame 1102. Control frame 1101 on the left hand side is to support searching and navigation of files and directories. Main frame 1103 is to display source code file. Overview frame 1102 is for displaying a segment of source code (for example, definition of a referenced symbol) upon clicking a hypertext link in main frame 1103. For instance, by clicking on "N2" (label 1106), a code segment showing the macro definition is displayed in overview frame 1102 indicated by label 1104. Procedure in flowchart 1000 may be used to generate an HTML page for a source file to be displayed in main frame 1103, or an HTML page for a segment of source file (e.g. referenced symbol definition) to be displayed in overview frame 1102.

In flowchart 1000, step 1001 reads the request parameters from web site server, and gets source code file information from the parameters. The information may include a path, source file identifier, location of selected source code region, and/or selected symbol. The path may be the path for a package, or the requested file path that also includes package path. If file identifier is present in the parameters, step 1001 gets file name and path from file identifier mapping table of the package pointed by the package path. Then, step 1002 opens the source code file plus its SIR file.

Steps between 1003 and 1009 (inclusive) of chart 1000 generate an HTML page for a web browser to display the requested source code file (or a segment of the file). As an example, main frame 1103 shows the HTML page generated by steps between 1003 and 1009. Step 1004 creates HTML content indicated by label 1105 in FIG. 11. Steps between 1005 and 1008 (inclusive) of chart 1000 creates the following HTML segment using SIR records described in FIG. 7:

```
<PRE>
<a name="ln1">1</a> #<font color=green>include</font> "<a
href="/sir/c/example?i=2#ln0">add.h</a>"
<a name="ln2">2</a>
<a name="ln3">3</a> <font color=green>int</font> main(<font
color=green>int</font> argc, <font color=green>char</font> *argv[ ])
<a name="ln4">4</a>   {
<a name="ln5">5</a>     <font color=green>int</font> sum;
<a name="ln6">6</a>     <a href="?i=1&l=5&s=sum#ln5"
target=overview>sum</a> =
<a href="?i=2&l=3&s=add#ln3" target=overview>add</a>(<a
href="?i=2&l=1&s=N1#ln1" target=overview>N1</a>,
<a href="?i=2&l=2&s=N2#ln2"
target=overview>N2</a>);
<a name="ln7">7</a> }
</PRE>
```

The presentation of the above HTML content is displayed inside main frame 1103.

In flowchart 1000, step 1006 performs lexical analysis (since not all lexical SIR records are preserved in FIG. 7), and reads symbol token and delimiters from opened source code file. Step 1007 outputs delimiters and line numbers. At decision step 1018, if there is no more token, step 1008 will output HTML tag "</PRE>" ending verbatim. If a token is found, step 1010 uses line and column location of the token to locate associated SIR records for the token. If no record is found at decision step 1019, step 1014 outputs the token symbol or string. If a SIR record exists, decision steps 1015, 1017, and 1016 are to determine the hyperlink or syntax highlight of the token.

In the above HTML segment for file "main.c", source code line 6 contains 4 reference SIR records: reference of variable definition "sum", reference of function declaration "add", reference of macro "N1", and reference of macro "N2". Step 1011 creates the hyperlinks for those references. Similarly, step 1012 creates hyper link for preprocessing include statement (i.e., line 1 of "main.c"). Step 1013 controls syntax highlighting of symbols. More decision steps may be added after step 1016 for more categories of tokens for syntax highlighting, for example, variable declaration.

In a different embodiment, a client application such as IDE (106 in FIG. 1) may download the syntax and semantics of a source code listing from server computer 102. For example, the IDE may download a source code file together with its SIR file to present source code with referenced symbols, syntax highlighting, symbol outline, and collapsing/expanding multi-line source code constructs. Other source code presentation tools may include but not limited to applet of a web browser, a browser script in JavaScript, and a source code editor.

Figure 12:
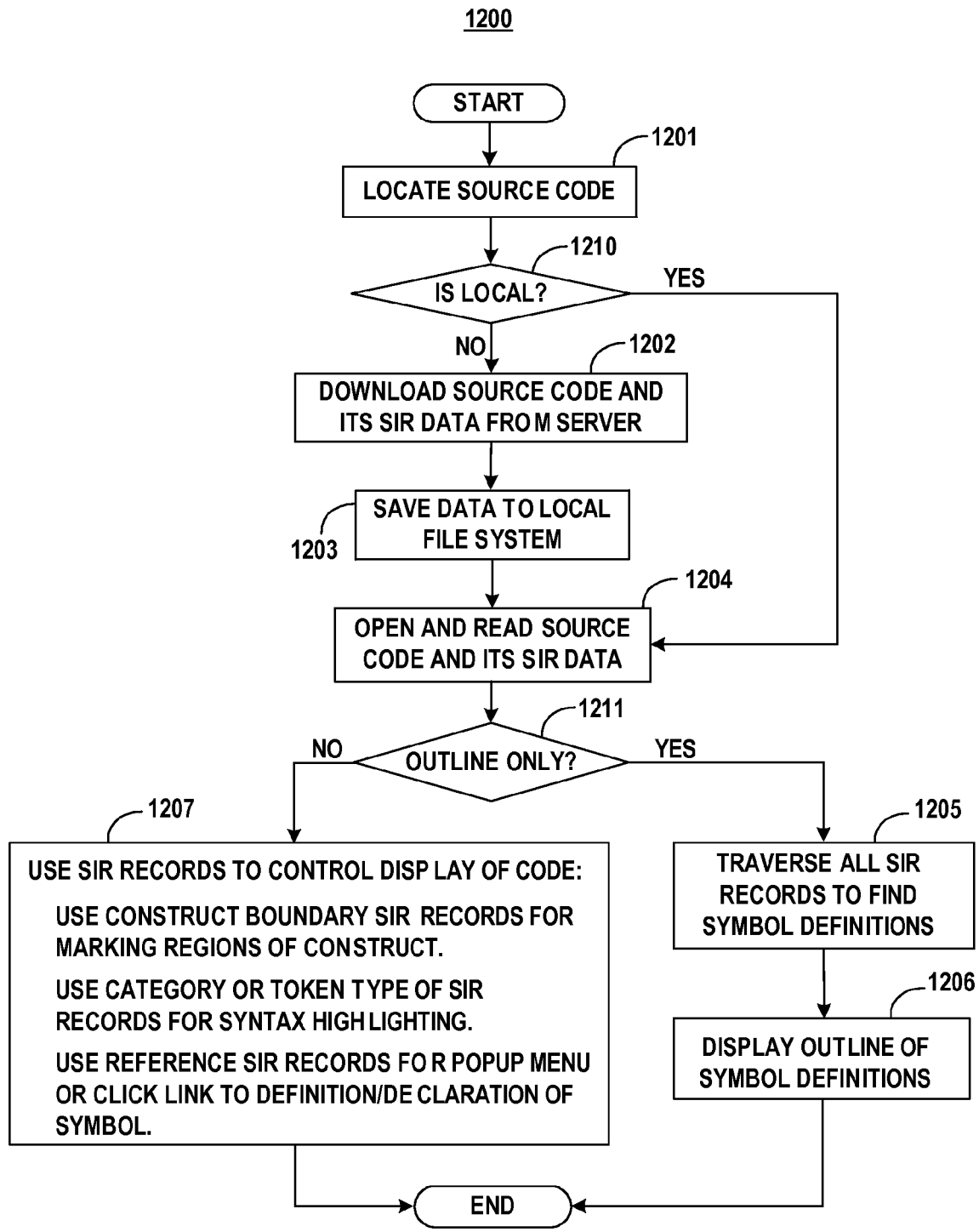
FIG. 12 is a flowchart illustrating a procedure to present source code using SIR data in an IDE.
Figure 13:
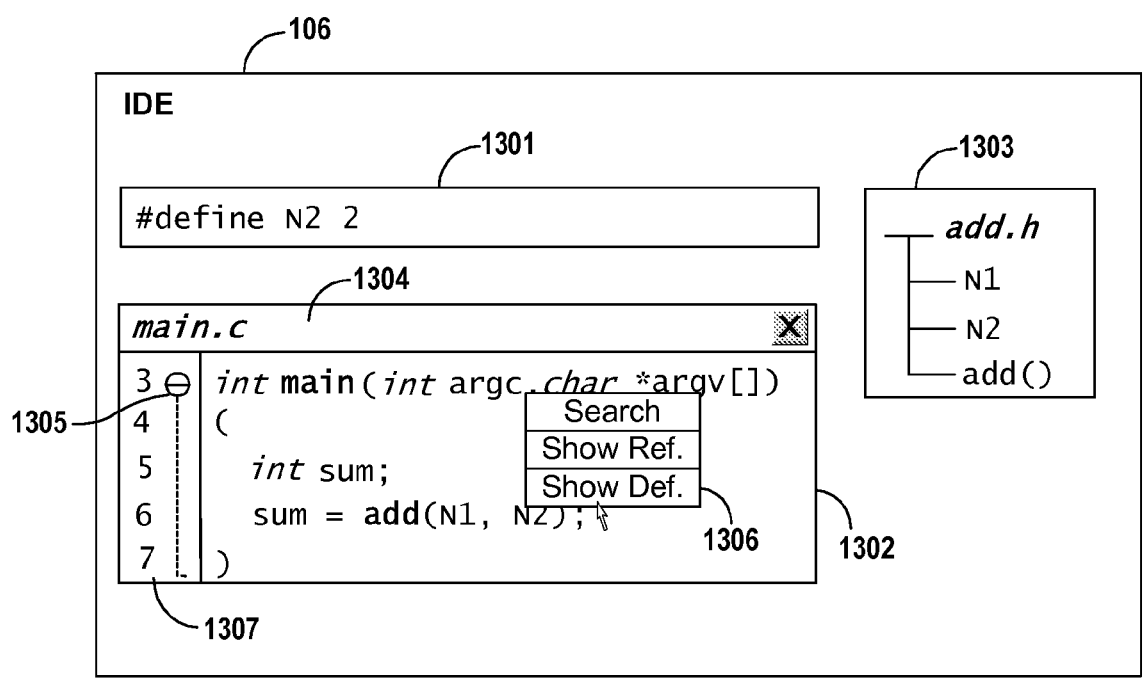
FIG. 13 is a drawing of an IDE presenting source code using the procedure in FIG. 12.

FIG. 12 shows a procedure flowchart (1200) that may be used to support source code presentation features in the IDE shown in FIG. 13. Step 1201, step 1202, step 1203, and step 1204 together with decision step 1210 in FIG. 12 fetch a source code listing and its SIR data. If the source code package resides on a remote server ("NO" at decision step 1210), step 1202 connects to the server and fetch the source code listing and its SIR data, then step 1203 saves transferred data contents on a local file system as a cache for future use. Step 1205, step 1206, and step 1207 use SIR data to guide IDE presentation of source code display elements. At decision step 1211, if the IDE is to display definition outlines ("YES" at decision step 1211), step 1205 and step 1206 control the display of symbol outline in frame 1303 of the IDE in FIG. 13. If the IDE is to display source code (not outlines), then step 1207 uses SIR records to control the display of the source code listing.

In FIG. 13, frame 1302 displays function main( ) of file main.c which is displayed in frame title bar 1304. Frame display region 1307 in frame 1302 display source code line numbers and controls for collapsing and expanding a source code construct region, for example, control icon 1305 is for collapsing function main( ). The region boundary information is obtained from SIR records of boundary category. Popup window 1306 uses SIR reference information in relationship SIR record of macro N2 to display its macro definition in frame 1301.

Source Code Analysis Using SIR Data

A procedure is provided to describe outlined steps to analyze source code files of a package through processing SIR files. The resulting data is called derived source code presentation (DSIR) data, which is any source code information generated by applying an algorithm to a SIR repository.

Figure 14:
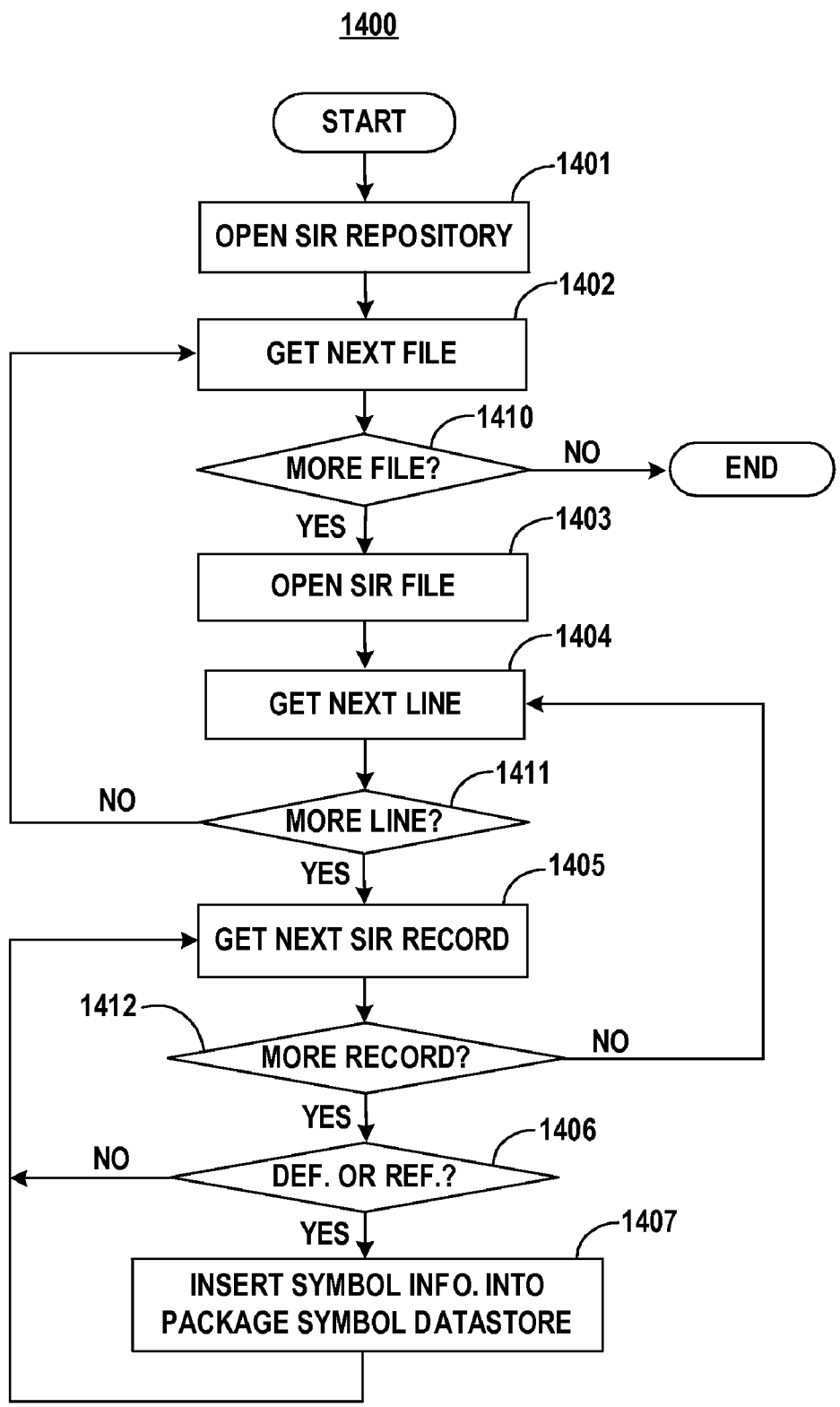
FIG. 14 is a flowchart illustrating a procedure to generate a symbol datastore from SIR data.

FIG. 14 shows a flowchart (flowchart 1400) for a source code analyzer to construct a datastore for searching symbol definitions and references (such as function, type, and macro). Step 1401 reads a list of files or a file identifier mapping table from a package. Step 1402 gets a file entry from the list/table. At decision step 1410, if no SIR file is found, the procedure terminates. If a file with a SIR file is found, step 1403 opens and loads the SIR file, then, step 1404 traverses the SIR file, and looks for SIR records of each line of the source code file. At decision step 1411, if there are more lines of SIR records, step 1405 starts a loop that goes through each SIR record of a line. At decision step 1412, if a SIR record is found, decision step 1406 checks the SIR record type, if the SIR record is of symbol definition or reference, then step 1407 inserts a search entry into a symbol datastore for the package.

Figure 15:
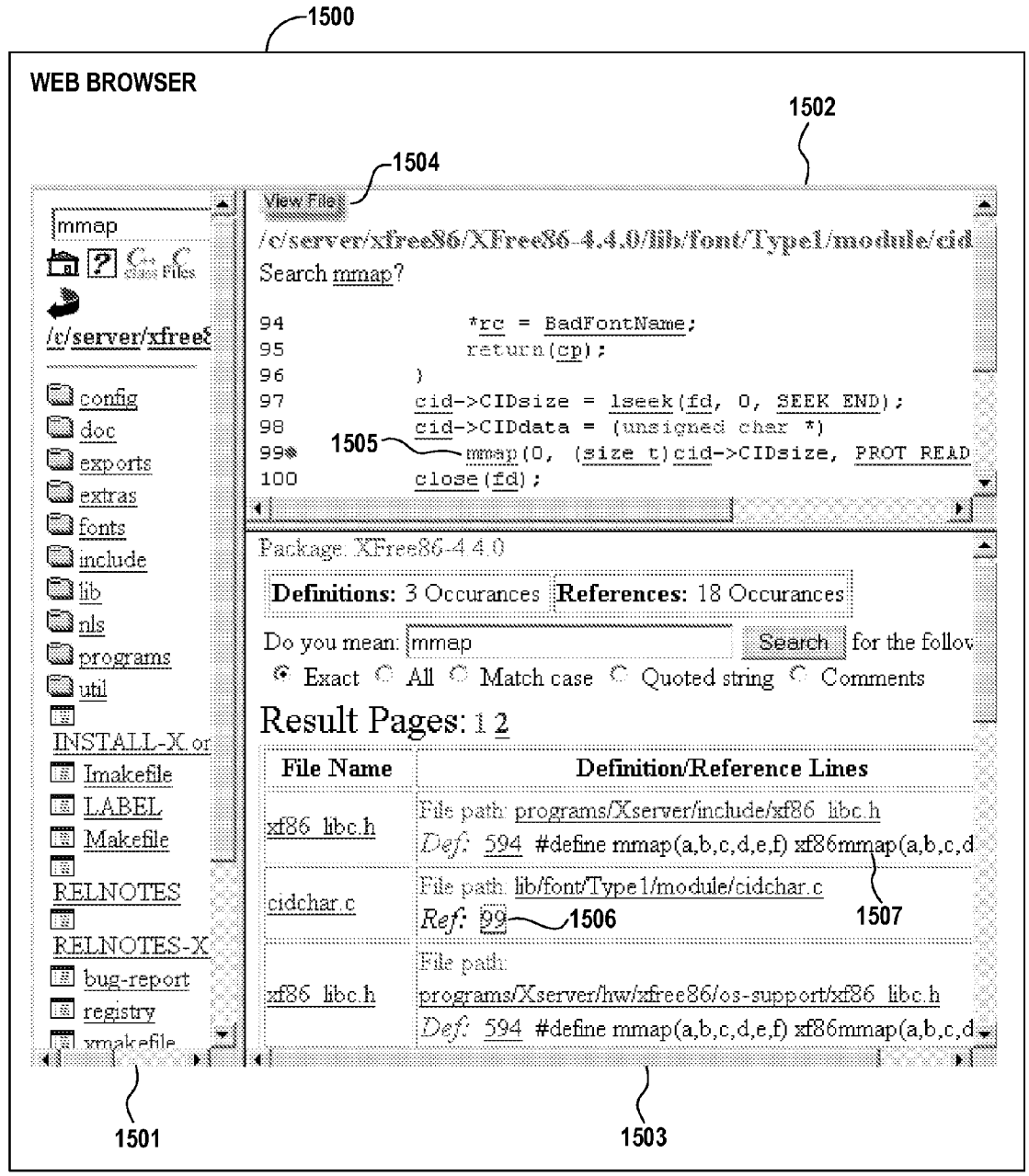
FIG. 15 shows a screen dump of three frames of a browser presenting an open source package with HTML control tags generated using SIR data and symbol search result generated using the symbol datastore created by the procedure shown in FIG. 14.

FIG. 15 is a screen dump of three window frames of a web browser for displaying search result of a package called Xfree86-4.4.0 (open source). HTML content responses are created by server module 108 in FIG. 1. In control frame 1501 for the package, a user starts a search for "mmap", the resulting list of files are shown in main frame 1503. Label 1507 shows a macro definition of "mmap". Label 1506 points to a line number of file "cidchar.c" that makes a reference to identifier "mmap" at line 99. By clicking hyperlink "99" of label 1506, the segment of source code that makes reference to "mmap" is shown in overview frame 1502. In overview frame 1502, label 1505 points to the source code line that makes reference of "mmap". Icon 1504 is a hyperlink to view complete source code file.

In a different embodiment of the current invention, a source code analyzer may follow SIR records of relationship category to obtain graphical presentation of source code construct elements, for example, class inheritance relationship for source code in an object-oriented programming language, method/function call graph, and reverse-engineered design graph.

Source Code Search Engine for Distributed Servers Hosting Source Code Packages

A source code search engine (105 in FIG. 1) uses captured source code information in a datastore (1610 in FIG. 16) and produces listings of source code information that best match searched criteria, which may be one or composition of language, symbol string, symbol type, package name, developer, license, key word, and such. The captured source code information stored in datastore 1610 may be collected from SIR repositories of packages hosted by distributed servers.

Figure 16:
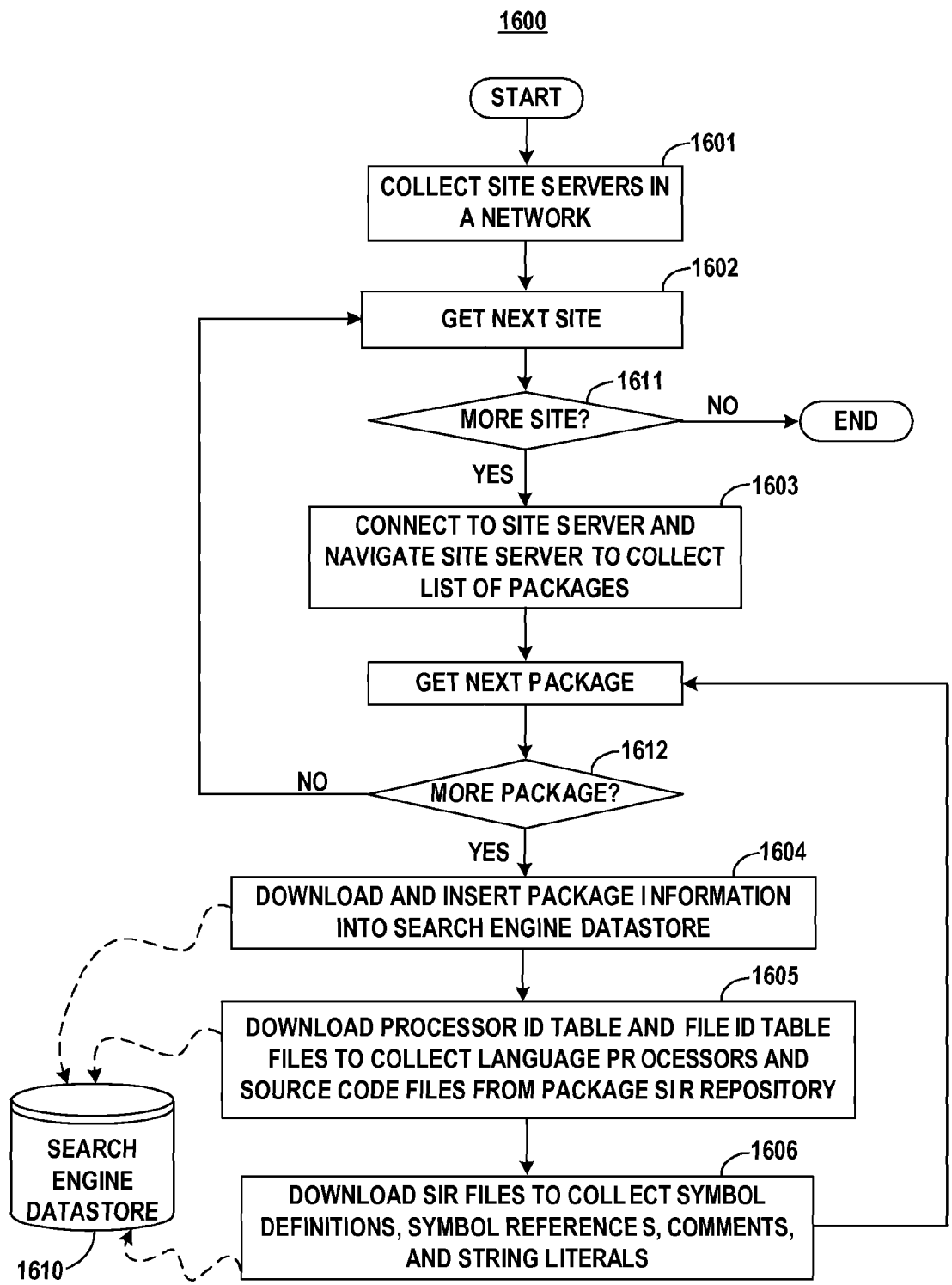
FIG. 16 shows a flowchart illustrating a procedure to generate a datastore for a source code search engine.

Procedure shown in FIG. 16 is a block flowchart (1600) to generate datastore/database 1610 for a source code search engine. Datastore 1610 provides source code search information for search engine 105 in FIG. 1. At step 1601, the procedure collects hosting servers through possible methods such as server registration, domain gathering, and IP address scanning. Then, starting at step 1602, the procedure goes through each collected server sites and each package hosted by a server to collect source code information. At decision step 1611, if there are no more sites, then the procedure terminates. Otherwise, at step 1603, the procedure connects to a server to collect a list of accessible packages. The package list may be provided by the server, or may be obtained through navigating through server package organization structure.

At decision step 1612, if there are no more packages at a site, then the control loops back to step 1602 to find the next site. If there are more packages, at step 1604, the procedure collects information about a package such as name, developer, version, license, and home URL, and then inserts it into datastore 1610. The package information may be described in a data file provided the server. Then, at step 1605, the process downloads processor and file identifier mapping tables to collect source code processors and source code files from the package and save the information into the datastore. At step 1606, the procedure download source code files with their SIR data from the server to collect source code SIR data and save the data of interest to the datastore. The source code data include but not limited to definitions and references from the SIR data. By reading SIR data and derived SIR data, a search engine is able to obtain source code information without parsing and analyzing the source code. In a different embodiment of the current invention, the procedure may download the package symbol datastore to get source code symbol definitions and references, or the process may download an entire package together with its SIR repository for building search entries.

It is import to note that the preceding examples for illustrations have been provided merely for the purpose of explanation and are in no way to be exhaustive or limited to the current invention. Although the invention has been described with reference to particular computer hardware, computer programming languages, algorithms, data formats, and embodiments, those of ordinary skill in the art understand the current invention for various embodiments with various modifications without deviating from the spirit and scope of the invention. Therefore, it is intended that this invention encompass all such variations and modifications as fall within the scope of the appended claims.

I claim:

1. A method for producing a source code intermediate representation of a source code package, the source code intermediate representation comprising a plurality of intermediate representation data sets, the method comprising:
   providing a data storage;
   analyzing a first source code listing of the source code package using a source code processor for a syntax, wherein the source code processor performs at least parsing of the first source code listing using the syntax;
   analyzing a second source code listing of the source code package using the source code processor;
   creating a plurality of listing identifiers comprising a first listing identifier indicating a first listing mapping to the first source code listing and a second listing identifier indicating a second listing mapping to the second source code listing;
   creating one or more processor identifiers comprising a processor identifier indicating a processor mapping to the source code processor;
   gathering source code information for composing an intermediate representation data set for a first construct of a plurality of constructs recognized by said source code processor, wherein the intermediate representation data set captures data fields comprising a first location of the first construct, a processor identification of said source code processor, a category for the intermediate representation data set, and an attribute describing the first construct;
   inserting the intermediate representation data set into a data set arrangement using the first location, wherein the data set arrangement uses at least one value of the first location for a position of the intermediate representation data set in the data set arrangement; and
   saving the data set arrangement into the data storage using a predetermined data format, whereby an application can identify and interpret the first construct in the first source code listing using the intermediate representation data set saved in the data storage.

2. The method of claim 1, wherein the data set arrangement comprises a listing data set group for the first source code listing, the method further comprising:
   arranging the intermediate representation data set in a line data set group for a source code line of the first source code listing; and
   arranging the line data set group in the listing data set group, wherein the at least one value of the first location is a line number of the first construct.

3. The method of claim 2, wherein said data storage is a file system and the listing data set group is saved in a predetermined file of said file system, whereby the predetermined file is loaded to memory and updated on demand.

4. The method of claim 1, wherein the category indicates a token of source code and the attribute comprises characters of the token.

5. The method of claim 1, wherein the category indicates a construct identity of an enclosure construct of the first construct and the attribute comprises a symbol.

6. The method of claim 1, wherein the category indicates a relationship between the first construct and a related element, and the attribute comprises a reference to the related element.

7. The method of claim 6, wherein the related element is a second construct of the second source code listing, the reference is a symbol reference, the method further comprising:
   building a symbol location mapping table for mapping symbol definition locations into symbol identifiers, wherein the intermediate representation data set stores a symbol identifier of a referenced symbol in the attribute.

8. The method of claim 1, wherein the category indicates a construct boundary of an enclosure construct of the first construct and the attribute comprises a type of the construct boundary.

9. The method of claim 1, wherein the category indicates an interpretation of the first construct and the attribute comprises an interpretation value.

10. The method of claim 9, wherein the interpretation value is a macro expansion of preprocessing.

11. A method for presenting source code through a web server application using source code intermediate representation (SIR), the method comprising:
   receiving a client request to present a source code segment of a first source code listing, wherein the client request comprises one or more request parameters about the source code segment;
   receiving a plurality of SIR data sets for a plurality of constructs of the first source code listing, wherein a SIR data set of the plurality of SIR data sets captures data fields comprising a location of a first construct, a category for the SIR data set, and an attribute describing the first construct;

receiving a plurality of listing identifiers comprising a first listing identifier indicating a first listing mapping to the first source code listing and a second listing identifier indicating a second listing mapping to a second source code listing;

receiving one or more processor identifiers comprising a processor identifier indicating a processor mapping to a source code processor that uses a syntax to analyze the first source code listing;

traversing the plurality of SIR data sets for generating a hypertext segment comprising a plurality of tags using the plurality of SIR data sets, wherein a tag of the plurality of tags is created for the first construct with steps comprising:

identifying a token of the first construct using the location of the SIR data set, wherein the location comprises a line number of the token and a column number of the token; and creating the tag for presenting the token using one or more data fields of the SIR data set; and delivering the hypertext segment in response for the client request.

12. The method of claim 11, wherein the category indicates a relationship, the attribute comprises a reference to a second construct of the second source code listing, the reference comprises a pointer to the second source code listing and a line number of the second construct, and the tag is a hyperlink tag created using the SIR data set, wherein a first hyperlink parameter of the hyperlink tag comprises the pointer, and a second hyperlink parameter comprises the line number.

13. The method of claim 12, further comprising: receiving a listing identifier mapping table which comprises mapping entries of the first listing identifier for the first source code listing and the second listing identifier for the second source code listing, wherein a request parameter of the client request comprises the first listing identifier, and the pointer is the second listing identifier.

14. A method for presenting source code using source code intermediate representation, the method comprising:

receiving a source code intermediate representation (SIR) which comprises a plurality of SIR data sets for a plurality of constructs of a first source code listing, wherein a SIR data set of the plurality of SIR data sets captures data fields comprising a location of a first construct, a category for the SIR data set, and an attribute describing the first construct;

receiving a plurality of listing identifiers comprising a first listing identifier indicating a first listing mapping to the first source code listing and a second listing identifier indicating a second listing mapping to a second source code listing;

receiving one or more processor identifiers comprising a processor identifier indicating a processor mapping to a source code processor that uses a syntax to analyze the first source code listing;

traversing the plurality of SIR data sets for generating a plurality of presentation elements for presenting the first source code listing using the plurality of SIR data sets, wherein a presentation element of the plurality of presentation elements is created for the first construct with steps comprising:

identifying a token of the first construct using the location of the SIR data set, wherein the location comprises a line number of the token and a column number of the token; and creating the presentation element for presenting the token using one or more data fields of the SIR data set; wherein a related element of a reference is a second construct of the second source code listing, the reference comprises the second listing identifier and a line number of the second construct in the second source code listing; and delivering the plurality of presentation elements for displaying.

15. The method of claim 14, further comprising:
making a server request to download the source code intermediate representation.

16. The method of claim 14, further comprising:
providing a file system which stores the source code intermediate representation; and
opening at least one file in the file system for at least read access.

17. The method of claim 14, wherein the category indicates a construct boundary, the presentation element is an icon indicating the construct boundary, the icon is positioned using the location, and the icon provides controls for collapsing and expanding a construct source code region.

18. The method of claim 14, wherein the presentation element is a syntax highlighted symbol with a font differentiated by the category.

19. The method of claim 14, wherein the presentation element is an entry of a symbol outline of the first source code listing, and the category indicates a construct identity.

20. The method of claim 14, wherein the presentation element is a navigation link, the category indicates a relationship, the attribute comprises the reference to the related element, and the navigation link leads to a presentation of the related element in a display frame using the reference.

21. A computing system having instructions stored thereon which, when executed, cause a computing processor to perform the following method:

receiving a source code intermediate representation (SIR) which comprises a plurality of SIR data sets for a plurality of constructs of a first source code listing, wherein a SIR data set of the plurality of SIR data sets captures data fields comprising a location of a first construct, a category for the SIR data set, and an attribute describing the first construct;

receiving a plurality of listing identifiers comprising a first listing identifier indicating a first listing mapping to the first source code listing and a second listing identifier indicating a second listing mapping to a second source code listing;

receiving one or more processor identifiers comprising a processor identifier indicating a processor mapping to a source code processor that uses a syntax to analyze the first source code listing;

traversing the plurality of SIR data sets for generating a plurality of presentation elements for presenting the first source code listing using the plurality of SIR data sets, wherein a presentation element of the plurality of presentation elements is created for presenting the first construct with steps comprising:

identifying a token of the first construct using the location of the SIR data set, wherein the location comprises a line number of the token and a column number of the token; and creating the presentation element for presenting the token using one or more data fields of the SIR data set; wherein a related element of a reference is a second construct of the second source code listing, the reference comprises the second listing identifier and a line number of the second construct in the second source code listing; and delivering the plurality of presentation elements for displaying.

22. The computing system of claim 21, wherein the presentation element is a navigation link, the category indicates a relationship, the attribute comprises the reference to the related element, and the navigation link leads to a presentation of the related element in a display frame using the reference.

\* \* \* \* \*